United States Patent
DeBaan et al.

[11] 3,749,210
[45] July 31, 1973

[54] SHOCK ABSORBER

[75] Inventors: Johannes Jasper DeBaan; Adolf Adrian, both of Ennepetal, Germany

[73] Assignee: Firma August Bilstein, Ennepetal-Altenvoerde, Germany

[22] Filed: Oct. 22, 1971

[21] Appl. No.: 191,872

[30] Foreign Application Priority Data
Nov. 2, 1970 Germany ............... P 20 53 826.5

[52] U.S. Cl. ................ 188/298, 188/315, 188/322
[51] Int. Cl. ............................................ B60g 11/26
[58] Field of Search ............... 188/298, 314, 315, 188/322; 74/18.2

[56] References Cited
UNITED STATES PATENTS
3,039,760  6/1962  Jackson ..................... 188/315 X
3,499,505  3/1970  DeCarbon ................... 188/322 X
3,527,451  9/1970  Long, Jr. ................... 188/315 X FOREIGN PATENTS OR APPLICATIONS
1,382,176  11/1964  France ....................... 188/322

Primary Examiner—M. Henson Wood, Jr.
Assistant Examiner—Michael Mar
Attorney—Karl F. Ross

[57] ABSTRACT

A rolling bellows of a shock absorber incorporating a damper unit is sealingly secured between a housing of the damper unit and a concentric cap encircling a piston rod extending from the damper unit. Sealing attachment is effected by two clamping rings which are dimensioned relative to the housing and the cap so that on sliding assembly the bellows material is compressed. The outer clamping ring may serve as a shield protecting all outwardly facing bellows surfaces.

8 Claims, 2 Drawing Figures

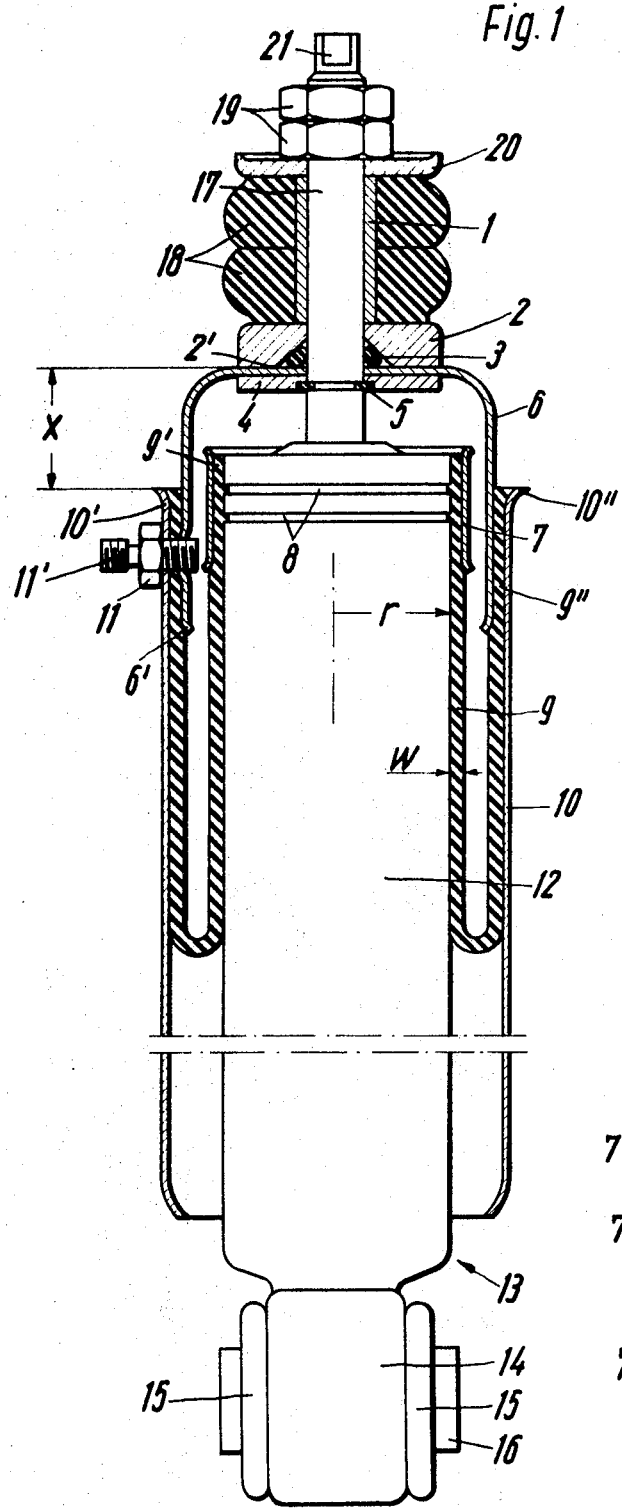

SHOCK ABSORBER

BACKGROUND OF THE INVENTION

This invention relates to shock absorber incorporating a damper unit, and wherein a rolling bellows which is to be filled with a fluid has its one end sealingly fastened by a clamping ring to an outer housing tube of the damper unit and has its other end sealingly fastened to a concentric cap connected to a piston rod extending from the damper unit.

DESCRIPTION OF THE PRIOR ART

In rolling bellows mountings for such legs it is known to deform the housing tube of a damper unit, the rolling bellows and a support piece pushed over them to a smaller diameter by mangetic force. However, in this type of assembly there is a danger of folds forming in the three structural elements which are jointly reduced in dameter.

It is further known to slide a clamping ring on to a rolling bellows which has been drawn over a housing tube of a damper unit and for example with the aid of an outer mandrel tool to deform the assembly so that the housing tube, the rolling bellows and the clamping ring have a larger diameter as compared to the pre-assembled state. After this increase in diameter, the rolling bellows is pressed outwardly against the housing tube by the clamping ring as well as by its own stress. With this rolling bellows mounting, in order to avoid too high an additional compression force by the clamping ring, a suitable choice of material for the latter, or a suitable limit to the diameter incrase, must be made.

SUMMARY OF THE INVENTION

Consequently, the present invention is concerned with the problem of providing a rolling bellows mounting which involves simple attachment means, which is particularly easy to produce with reliable sealing of the rolling bellows at its clamped areas, and whereby currently available damper units can be used without any constructional alterations and can be fitted into the shock absorber.

In accordance with the invention there is provided a shock absorber comprising a damper unit externally defined by a housing tube; a piston rod extending outwardly of the housing tube; a cap secured to said piston rod and concentric with respect to the damper unit; and a rolling bellows arranged to be filled with a fluid and having its ends sealingly attached by first and second clamping rings to said housing tube and to said cap respectively. The clamping rings, before assembly, in the unit have internal radii which exceed the external radii of the housing tube and cap respectively by less than the wall thickness of the rolling bellows, and on assembly are force fitted over the housing tube and cap to clampingly compress the bellows ends therebetween.

The appropriate selection of the internal radii of the unassembled clamping rings relative to the external radii of the cap and of the housing tube, taking into account the wall thickness of the rolling bellows, means that after they have been pushed into the tight clamped position the clamping rings and cap and housing tube are pressed sufficiently strongly against both sides of each end of the rolling bellows, to achieve the sealing seat. No mechanical distortion of the metal parts is necessary and the attachment of the rolling bellows is effected at the same time as the fitting of the damper unit by the use of a simple pusher for sliding together the clamping rings and the cap and housing tube.

According to a preferred feature of the invention, the second clamping ring which presses the rolling bellows on to the cap is a protective tube which covers the outwardly facing bellows surfaces. This arrangement, which is easy to attain by extending the clamping ring axially, means that the bellows is protected over its entire length from adverse mechanical and chemical influences. Small stones and salt water spray thus cannot cause premature wear of the shock absorber when mounted on a vehicle through damage to the rolling bellows. If the axial length of the protective tube corresponds to the length of stroke of the leg, then the rolling bellows can be reliably protected in all positions, even in its maximum extended position.

According to another preferred feature of the invention, the shock absorber includes a filler connector for filling or emptying the bellows wherein the filler connector is tightly screwed into the part of the cap which is covered by the rolling bellows. On tightening of the filler connector, the material of the cap is drawn into the rubber bellows in the region of tbe hole so that a satisfactory seal is obtained.

BRIEF DESCRIPTION OF THE DRAWINGS

An embodiment of the invention will now be described in greater detail with reference to the accompanying drawing, in which:

FIG. 1 is a longitudinal sectional view through a shock absorber according to the invention; and FIG. 2 shows a clamping ring before assembly in the shock absorber leg of FIG. 1.

DESCRIPTION OF THE PREFERRED EMBODIMENT

The shock absorber shown in FIG. 1 comprises a damper unit 13 defined by an outer tube 12 filled with damping fluid. The leg is fastened, for example to a wheel axle of a vehicle, by means of a securing eyelet 14 fitted to the lower end of the tube 12, a rubber buffer 15, and a sleeve 16. A piston rod 17 projects sealingly from the upper closed end of the tube 12. Inside the damper unit 13 the piston rod 17 carries a damping piston (not shown). The outer end of the piston rod 17 is coupled to the chassis of the vehicle by means of several fastening elements. These elements comprise rubber rings 18 which are pushed over a spacing collar 1 encircling the piston rod 17. The lower rubber ring lies on a thrust ring 2 and is pressed by the upper rubber ring against the thrust ring by tightening nuts 19 which act through a clamping ring 20. The nuts 19 can be screwed down and braced against each other on a thread formed on the upper end of the piston rod 17, if necessary by clamping the piston rod 17 stationary by means of a key fitted into a square recess 21 in the end of the piston rod. The position of the thrust ring 2 on the piston rod 17 is determined by a plate 4 which, in turn, is secured by a circlip 5 against displacement in the direction towards the tube 12. The thrust ring 2 is pressed on to a cap 6 and thereby clamps an annular sealing ring 3 so that a satisfactory sealing of the piston rod 17 is achieved. The thrust surfaces 2' of the thrust ring are so angled that they press the sealing ring 3 against the junction between the piston rod 17 and the rim of the hole through the cap 6.

The cap 6, which may be made of sheet metal, encircles the piston rod 17 and in the compressed state of the shock absorber encircles the upper end of the outer tube 12 of the damper unit. The cap 6 supports one end 9" of a rolling bellows 9, the end which lies radially further from the piston rod 17. The other end 9' of the bellows is attached to the upper end of the outer tube 12. The rolling bellows end 9" is pressed by a clamping ring 10' against the cap 6, while the rolling bellows end 9' is pressed by a clamping ring 7 against the upper end of the outer tube 12. The upper end of the tube 12 is provided in its otherwise smooth and perfectly cylindrical clamping surface free from projections with annular grooves 8 into which the material of the rolling bellows is forced so as to provide a better sealing connection which is also more secure against displacement.

The rolling bellows 9 which is made of resilient material, rubber, and which can be made for example a cylindrical tube is inverted at its end 9" so that this end of the bellows is thereby radially more remote from the piston rod than the end 9'. In the event of the piston rod 17 having travelled fully into the damper unit, the end 9" of the bellows lies approximately at the level of the rolling bellows end 9'. The bellows surfaces which face outwardly after the end 9" of the bellows has been turned up are protected by the clamping ring 10' which forms a protective tube 10, so that after mounting of the shock absorber on a vehicle these surfaces cannot be mechanically damaged by flying stones or chemically destroyed by upwardly spraying salt water. The protective tube 10 is sufficiently long that it protects the rolling bellows even when the shock absorber has been extended to its fullest extent. Consequently, in the compressed state of the shock absorber the lower end of the protective tube 10 extends down to the vicinity of the lower attachment means 14, 15, 16 of the shock absorber. The clamping rings 7 and 10' and the cap 6 are provided at their ends which press on to the rolling bellows with out-turned rims 7', 7" and 10" and an in-turned rim 6' respectively, by which excessive stress on the rolling bellows is avoided, particularly when assembling the shock absorber.

A filler connector 11 is sealingly screwed tightly into the cap 6 in the region covered by the rolling bellows 9. The nipple 11' of the filler connector is screwed in and is tightened so strongly by an associated nut that the material of the cap 6 in the region of the thread of the filler connector is distorted and drawn into the rolling bellows 9. This seal is, in the same way as the seal achieved by the clamping rings 10' and 7 and by the thrust ring 2 above the sealing ring 3, so good that on filling the rolling bellows 9 and the space enclosed by the cap 6 with a fluid, for example compessed air or an oil which does not attack the rolling bellows material, the piston rod 17 is forced upwardly so that the level of the parts, e.g., wheel axle and vehicle chassis, between which the shock absorber is mounted can be adjusted by filling the leg to different degrees.

The clamping ring 7 shown on an enlarged scale in FIG. 2 has an internal radius R which exceeds the external radius r of the outer tube 12 by less than the non-compressed wall thickness w of the bellows 9. Its cross-sectional shape corresponds to that of the outer pipe 12 and its rims 7', 7" are out-turned for the purpose mentioned above.

The method of producing the rolling bellows fastening is as follows. The outer tube 12 of the damper unit, which can be filled with damping fluid and assembled in the shock absorber in its finished state, is provided at its upper end, as mentioned above, with two annular grooves 8 by which an improved securement of the rolling bellows 9 to the outer pipe 12 is achieved. The clamping ring 7 is first pushed over the end 9' of the bellows and the outer tube 12, or the whole damper unit 13, is pushed with a pusher device into the bellows until the upper end of the outer tube 12 is level with the rim of the end 9' of the bellows or the clamping ring 7. By appropriate dimensioning of the internal radius R of the clamping ring 7 and of the radius r of the outer tube 12, the rolling bellows 9 is thereby strongly compressed. Due to this fitting the internal radius of the clamping ring 7 is slightly increased while the external radius of the outer tube 12 is slightly reduced. These alterations to the dimensions are determined only by the materials of the interfitting structural parts and by their pliability and no special steps to alter the shape of the parts for improved attachment are required.

After inversion of the end 9" of the rolling bellows, the cap 6 is pushed in up to a predetermined depth $x$. After that, the protective tube 10 is pressed on to the cap 6 by way of the bellows, the cap and tube being slightly distorted owing to their comparatively small wall thicknesses of about 1 mm. The tube diameter may increase for example by about 1 mm and the cap diameter can be reduced by about 1mm.

In order to obtain a better sliding of the parts when fitting them together they may be provided with slide means, for example on the clamping surface of the protective tube 10 or of the outer tube 12.

We claim:

1. A shock-absorber leg comprising a damper unit defined by a housing tube; a piston rod extending outwardly of the housing tube; a cap secured to said piston rod and concentric with respect to the damper unit; and a rolling bellows arranged to be filled with a fluid and having its ends sealingly attached by first and second clamping rings to said housing tube and to said cap respectively, the clamping rings before assembly in the leg having internal radii which exceed the external radii of the housing tube and cap respectively by less than the wall thickness of the rolling bellows, the clamping rings on assembly being force fitted over the housing tube and cap to clampingly compress the bellows ends therebetween, said second clamping ring being a protective tube and covering the outwardly facing bellows surfaces.

2. A shock-absorber leg according to claim 1, wherein the axial length of the protective tube corresponds to the length of stroke of the leg.

3. A shock-absorber leg according to claim 1, wherein the clamping rings and the cap are outwardly and inwardly curved respectively at their rims which press against the bellows.

4. A shock-absorber leg according to claim 1, including a filler connector for filling or emptying the bellows wherein the filler connector is tightly screwed into the part of the cap which is covered by the rolling bellows.

5. A shock-absorber leg according to claim 1, wherein the rolling bellows, the cap and the housing tube are provided with slide means on the clamping surfaces before being interfitted.

6. A shock-absorber leg comprising a damper unit defined by a housing tube; a piston rod extending outwardly of the housing tube; a cap secured to said piston rod and concentric with respect to the damper unit; and a rolling bellows arranged to be filled with a fluid and having its ends sealingly attached by first and second clamping rings to said housing tube and to said cap respectively, the clamping rings before assembly in the leg having internal radii which exceed the external radii of the housing tube and cap respectively by less than the wall thickness of the rolling bellows, the clamping rings on assembly being force fitted over the housing tube and cap to clampingly compress the bellows ends therebetween, said housing tube having annular grooves in its clamping surface.

7. A shock absorber comprising a damper unit having an external housing tube of smooth cylindrical configuration free from projections; a piston rod extending outwardly axially from said housing tube; a cap secured to said piston rod and coaxial with said damper unit; a rolling bellows adapted to be filled with a fluid and having a first end fitting over said housing tube and a second end fitting over said cap; and a pair of sheet metal clamping rings fitted over each end of said bellows for respectively connecting same to said housing tube and said cap under compression, at least said ring surrounding said first end of said bellows retaining same against said housing tube solely by elastic deformation of the last mentioned ring, said bellows and said housing tube, said clamping rings having internal radii which exceed the external radii of said housing tube and said cap respectively by less than the wall thickness of said bellows.

8. A shock absorber as defined in claim 7 wherein the clamping rings and said cap are outwardly and inwardly curved respectively at their rims which press against said bellows.

* * * * *